United States Patent
Auvray et al.

(10) Patent No.: US 8,086,193 B2
(45) Date of Patent: Dec. 27, 2011

(54) METHOD OF CONFIGURING A MULTI-NETWORK TERMINAL AND AN ASSOCIATED MULTI-NETWORK TERMINAL

(75) Inventors: Vincent Auvray, Tonneville (FR); Patrick Bauban, Paris (FR)

(73) Assignee: France Telecom, Paris (FR)

( * ) Notice: Subject to any disclaimer, the term of this patent is extended or adjusted under 35 U.S.C. 154(b) by 546 days.

(21) Appl. No.: 12/307,306

(22) PCT Filed: Jun. 19, 2007

(86) PCT No.: PCT/FR2007/051463
§ 371 (c)(1),
(2), (4) Date: Jan. 2, 2009

(87) PCT Pub. No.: WO2008/003882
PCT Pub. Date: Jan. 10, 2008

(65) Prior Publication Data
US 2009/0203397 A1    Aug. 13, 2009

(30) Foreign Application Priority Data
Jul. 3, 2006 (FR) ...................................... 06 52764

(51) Int. Cl.
*H01Q 11/12* (2006.01)

(52) U.S. Cl. ............... 455/127.4; 455/552.1; 455/553.1; 455/160.1; 455/436

(58) Field of Classification Search .................. 455/411, 455/412.1, 414.1, 422.1, 426.1, 432.3, 435.1, 455/436, 438, 443, 444, 127.4, 552.1, 553.1, 455/160.1, 435.2
See application file for complete search history.

(56) References Cited

U.S. PATENT DOCUMENTS

| | | | | |
|---|---|---|---|---|
| 6,636,491 B1 * | 10/2003 | Kari et al. | ...................... | 370/328 |
| 7,079,836 B2 * | 7/2006 | Shi et al. | ..................... | 455/414.1 |
| 7,451,218 B2 * | 11/2008 | Malik et al. | ................... | 709/225 |
| 7,574,660 B2 * | 8/2009 | Campbell et al. | ............. | 715/741 |
| 7,769,385 B2 * | 8/2010 | Gallagher et al. | ............ | 455/436 |
| 2005/0187682 A1 * | 8/2005 | Gault et al. | ...................... | 701/33 |
| 2006/0120329 A1 | 6/2006 | Kim et al. | ..................... | 370/331 |
| 2007/0250677 A1 * | 10/2007 | Ware et al. | ..................... | 711/167 |
| 2008/0102749 A1 * | 5/2008 | Becker | ......................... | 455/3.06 |

OTHER PUBLICATIONS

Ruiz, Pedro et al. "Adaptive Multimedia Multi-party Communication in Ad Hoc Environments," Proceedings of the 47th Hawaii International Conference of System Sciences. Jan. 2004.
Chu, Hao-hua. "Challenges: Wireless Web Services," Proceedings of the Tenth International Conference on Parallel and Distributed Systems. 2004.
International Search Report from counterpart foreign application No. PCT/FR2007/051463.

* cited by examiner

*Primary Examiner* — Dominic E Rego
(74) *Attorney, Agent, or Firm* — David D. Brush; Westman, Champlin & Kelly, P.A.

(57) ABSTRACT

A method and apparatus are provided for configuring a multi-network telecommunications terminal, which communicates with a number of telecommunications networks offering a plurality of telecommunications services. The terminal includes a plurality of interfaces for accessing the services offered. When the terminal accesses one of the services offered, via one of the networks, the following steps are performed: a) determining the type of network with which the terminal is in the process of connecting, b) activating the access interface associated with the service which the terminal is intended to access, c) requesting, at the level of the activated access interface, configuration parameters which are dependent on the activated access interface and the network in the process of connection, d) extracting, at the level of a module for centralizing configuration parameters, the requested configuration parameters, e) obtaining, at level of the activated access interface, the extracted configuration parameters.

7 Claims, 3 Drawing Sheets

T

| NETWORKS | | | | | |
|---|---|---|---|---|---|
| | | Mobile | | Fixed | |
| | | GSM | EDGE | WiFi | PSTN |
| SERVICES | SMS | *Conf_M1* | *Conf_M2* | *Conf_M3* | *Conf_M4* |
| | | IP address of SMS-C | IP address of SMS-C | IP address of SMS-C | IP address of SMS-C |
| | INTERNET BROWSING | *Conf_M5* | *Conf_M6* | *Conf_M7* | *Conf_M8* |
| | | · proxy server network address<br>· browsing identifier for light contents adapted to GSM bitrate | · proxy server network address<br>· browsing identifier for light contents adapted to EDGE bitrate | · proxy server network address<br>· browsing identifier for light contents adapted to WiFi bitrate | · proxy server network address<br>· browsing identifier for light contents adapted to PSTN bitrate |
| | INSTANT MESSAGING (IM) | *Conf_M9* | *Conf_M10* | *Conf_M11* | *Conf_M12* |
| | | · IP address of front-end server of IM platform<br>· mode of operation adapted to GSM bitrate (manual updating of presence and by the contact, raw texts, ...) | · IP address of front-end server of IM platform<br>· mode of operation adapted to EDGE bitrate (manual updating of all contacts, rich texts (bold/italic/underline, ...)) | · IP address of front-end server of IM platform<br>· mode of operation adapted to WiFi bitrate (automatic updating in real time of buddy list presence, rich texts, animated icons, animations, ...) | · IP address of front-end server of IM platform<br>· mode of operation adapted to PSTN bitrate (automatic updating in real time of buddy list presence, rich texts, animated icons, animations, ...) |
| | ... | | | | |

Fig. 2

METHOD OF CONFIGURING A MULTI-NETWORK TERMINAL AND AN ASSOCIATED MULTI-NETWORK TERMINAL

CROSS-REFERENCE TO RELATED APPLICATIONS

This Application is a Section 371 National Stage Application of International Application No. PCT/FR2007/051463, filed Jun. 19, 2007 and published as WO 2008/003882 on Jan. 10, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to telecommunications in general and to multi-network telecommunications terminals in particular.

BACKGROUND OF THE DISCLOSURE

Some telecommunications terminals are adapted to communicate in more than one telecommunications network using respective different communications protocols.

Thus such terminals can communicate over a GSM (Global System for Mobile communications) network and a WiFi (Wireless Fidelity) network, for example.

Such terminals can therefore access a number of services offered in the various networks in which they can communicate.

To this end, current telecommunications terminals for a telecommunications network of a given type, for example a GSM network, include a communications interface that is configured to communicate with the GSM network and includes access interfaces for services offered in the GSM network. Such access interfaces consist, for example, of electronic mail client software, Internet browsing client software, instant messaging client software, etc.

Each of the above kinds of client software has a specific configuration which, in the absence of manual intervention, remains static over time.

The term "configuration" refers to a set of parameters that are a function of the type of telecommunications network (mobile, fixed, wireless, etc.), the interconnection elements that constitute it (antennas, base stations, routers, etc.), and the type of services offered in a particular type of network (instant messaging, Internet browsing, etc.).

For example, Internet browsing client software can use a proxy server to access telecommunications network contents, or not. For example, in a WiFi network, the configuration of the Internet browsing client must be modified manually according to whether the telecommunications terminal equipped with such software is connected to a business WiFi network or a domestic WiFi network. Such modification is necessary because the terminal accesses the business WiFi network via a proxy server but a proxy server is not used if the same terminal accesses the domestic WiFi network.

Such modification at the initiative of the user proves time-consuming and complicated, especially for a non-technical user, given the increasing numbers of telecommunications networks and services which modern terminals can access.

SUMMARY

An aspect of the present disclosure relates to a method of configuring a telecommunications terminal able to communicate with a number of telecommunications networks offering a number of respective telecommunications services, said terminal including interfaces for accessing the services offered, said method being characterized in that when the terminal accesses one of the services offered via one of said networks the method includes the following steps:

a) determining the type of network to which the terminal is in the process of being connected;

b) activating the access interface associated with the service which the terminal is intended to access;

c) requesting, at the activated access interface, configuration parameters that are a function of the activated access interface and the network in the process of connection;

d) extracting the requested configuration parameters from a module for centralizing configuration parameters;

e) obtaining the extracted configuration parameters at the activated access interface.

These features confer greater operating flexibility on multi-network terminals when they access a service offered in a network. Such flexibility is a result in particular of centralized storage in the terminals of all configuration parameters liable to be selected by the terminals as a function of a given network to which they are connected and of the service that they intend to access in that given network.

Management of configuration parameters by the terminal is therefore greatly improved.

Methods conforming to one or more embodiments of the invention make use of one or the other of the following features:

the step a) of determining the type of network is effected either on starting the terminal or in the event of a modification relating to the connected network;

the step a) of determining the type of network and the step c) of requesting configuration parameters are effected manually.

The manual configuration feature has the advantage of enabling users to configure their terminal simply and quickly as a function of the type of network to which they wish to be connected and the type of service that they wish to access in said network.

From the user's point of view, the ergonomics of using the terminal are therefore greatly improved.

Another aspect of an embodiment of the invention provides a telecommunications terminal able to communicate with a number of telecommunications networks offering a number of respective telecommunications services, said terminal including interfaces for accessing said services offered, said terminal being characterized in that it includes:

a) means for determining the type of network to which the terminal is in the process of being connected;

b) means for activating the access interface associated with said service which the terminal is intended to access;

c) means for requesting configuration parameters that are a function of said activated access interface and said network in the process of connection;

d) means for extracting said requested configuration parameters from a module for centralizing configuration parameters;

e) means for obtaining said extracted configuration parameters.

A terminal conforming to one embodiment of the invention includes manual selection means for selecting the type of network to which the terminal is intended to be connected and configuration parameters associated with said network to be connected to and with the service that the terminal is intended to access in said network.

The advantages of the above multi-network terminal being similar to those of the above method, they are not explained here.

In one particular embodiment of the invention, the various steps of the configuration method are determined by computer program instructions.

Consequently, an embodiment of the invention is also directed to a computer program on an information medium and adapted to be used in a telecommunications terminal of the above-mentioned type, or more generally in a computer, said program including instructions for implementing the steps of a configuration method as described above.

This program can use any programming language and take the form of source code, object code, or a code intermediate between source code and object code, such as a partially-compiled form, or any other desirable form.

An embodiment of the invention is also directed to a computer-readable information medium containing instructions of a computer program as described above.

The information medium can be any entity or device capable of storing the program. For example, it can include storage means, such as a ROM, for example a CD ROM or a microelectronic circuit ROM, or magnetic storage means, for example a diskette (floppy disk) or a hard disk.

Moreover, the information medium can be a transmissible medium such as an electrical or optical signal, which can be routed via an electrical or optical cable, by radio or by other means. The program of an embodiment of the invention can in particular be downloaded over an Internet-type network.

Alternatively, the information medium can be an integrated circuit incorporating the program that is adapted to execute the method in question or to be used in its execution.

BRIEF DESCRIPTION OF THE DRAWINGS

Other features and advantages emerge in the course of the following description of one non-limiting embodiment of the invention, which is given with reference to the appended drawings, in which:

FIG. 2 is a data table showing various configuration parameters liable to be adopted by the FIG. 1 terminal.

DETAILED DESCRIPTION OF ILLUSTRATIVE EMBODIMENTS

Figure 1:
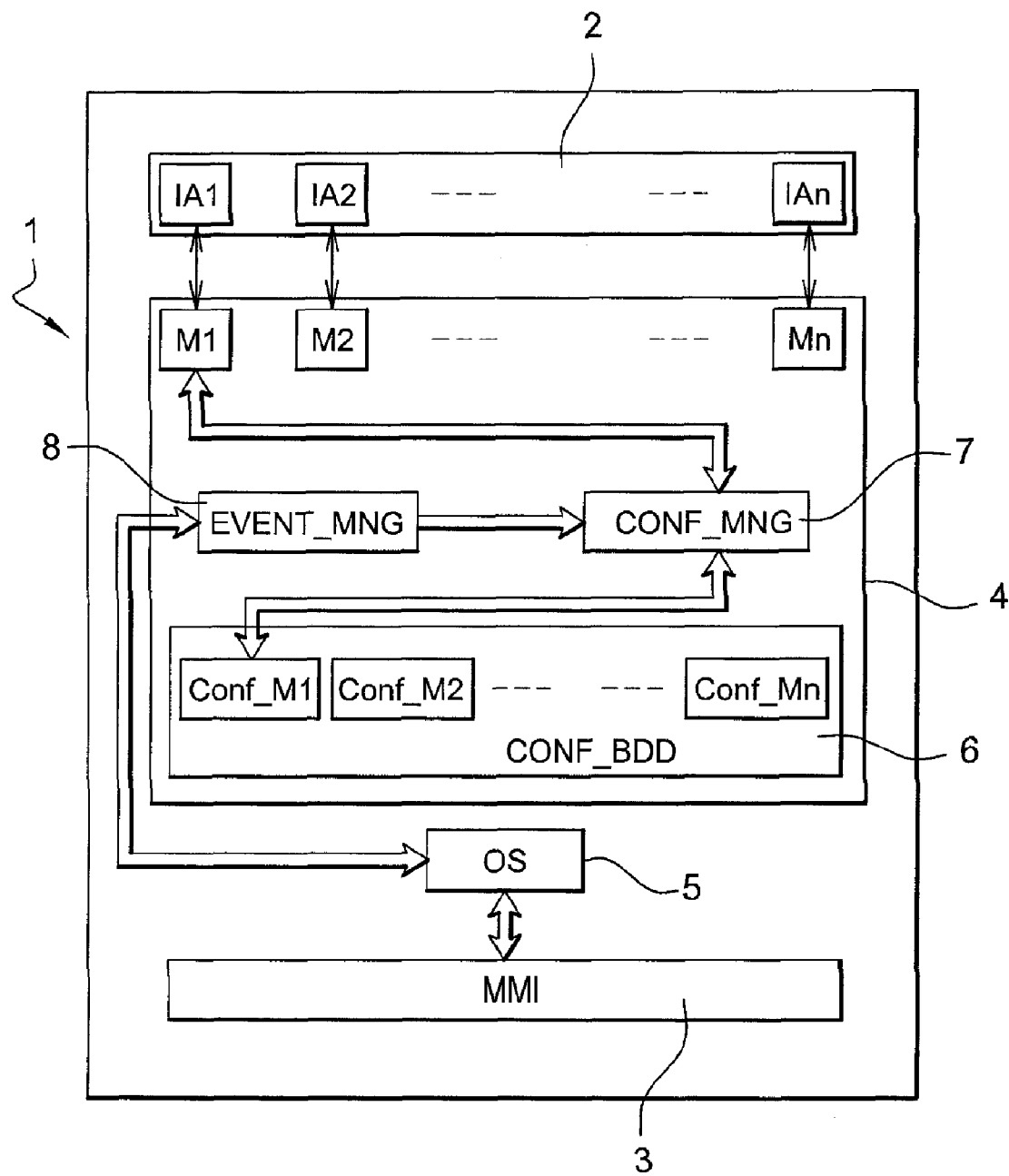
FIG. 1 is a functional block diagram of a multi-network terminal of one embodiment of the invention.

FIG. 1 represents a telecommunications terminal 1 of an embodiment of the invention.

The terminal 1 conventionally includes an interface 2 for communicating with a number of telecommunications networks. In the present example, the terminal 1 is a dual network terminal, i.e. the terminal 1 can be connected either to a first network (not shown), for example a GSM network, or a second network (not shown), for example a WiFi network.

The communications interface 2 includes a plurality of access interfaces IA1 . . . IAn. These graphical interfaces are intended, as mentioned above, to enable the terminal 1 to access services offered on the GSM or WiFi network.

In one particular, non-limiting application, one of the access interfaces, for example the interface IA1, consists of client software for sending and receiving SMS (Short Message Service) messages.

The terminal 1 also has a man-machine interface (MMI) 3 which conventionally includes a display screen, a loudspeaker, a microphone, a keypad, and associated control electronic circuits.

According to an embodiment of the invention, the terminal 1 includes a manager 4 for the configuration parameters of the terminal 1 that at the request of the terminal 1 supplies the configuration parameters associated with the network and the service that the terminal 1 is intended to access.

Figure 3:
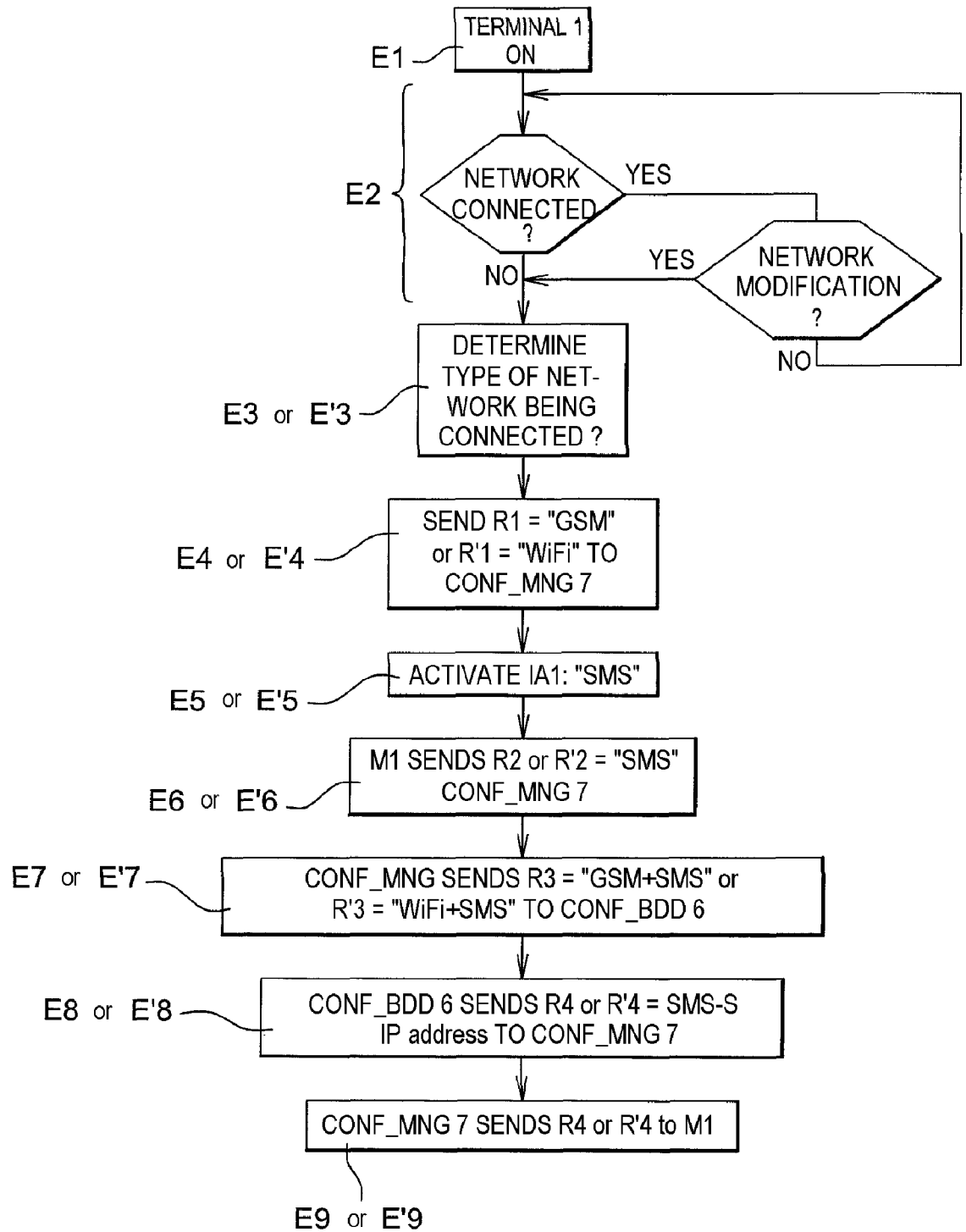
FIG. 3 is a flowchart of the main steps of a configuration method used in the FIG. 1 terminal.

The configuration parameter manager 4 is typically a computer program installed in the terminal 1 during manufacture or downloaded into it. The program 4 includes instructions for executing the steps of the configuration method, the flowchart of which is shown in FIG. 3. The program 4 is executed by a processor (not shown) installed in the operating system (OS) 5.

To be more precise, the configuration manager 4 includes application software modules M1, M2, . . . , Mn associated with the respective access interfaces IA1, IA2, . . . , IAn. Each of the modules M1, M2, . . . , Mn implements the communication methods of the network to which the terminal 1 is connected and incorporates the protocols used to access the services offered in that network.

In the present example, if the terminal 1 is connected to the GSM network, for example, the module M1 implements the communication methods of the GSM network and incorporates the protocols used to send and receive SMS messages.

Each module M1, M2, . . . , Mn is configured by means of a respective particular set Conf_M1, Conf_M2, . . . , Conf_Mn of configuration parameters.

Such parameters are stored in the terminal 1 beforehand, either at the factory or at the initiative of the telecommunication carrier. They include, for example:

the network address of various interconnection elements of a network, such as the IP (Internet Protocol) address of an SMS-C (Short Message Service Center), the IP address of a proxy server, etc.;

the electronic mail user identifier, the instant messaging user identifier, etc.

All the parameters Conf_M1, Conf_M2, . . . , Conf_Mn are stored centrally in a database CONF_BDD 6 (FIG. 1), which is highly advantageous. Thus each access interface IA1, IA2, . . . , IAn and its associated application software module M1, M2, Mn can access and therefore use all the above parameters.

As can be seen in FIG. 2, all the above parameters are stored in a matrix correspondence table T:

the first row of which indicates the types of network to which the terminal 1 can be connected; and the first column of which indicates the types of service to which the terminal 1 can be connected in a network of a given type.

In the present example, the terminal 1 can:

be connected to two different types of mobile network, GSM and EDGE (Enhanced Data for GSM Evolution), and to two types of fixed network, WiFi and PSTN (Public Switched Telephone Network); and access three different types of service in each of the above networks, namely sending/receiving SMS messages, Internet browsing, instant messaging (IM).

The terminal 1 can therefore be configured in accordance with 12 different sets of parameters. These 12 sets of parameters Conf_M1, Conf_M2, . . . , Conf_M12 are indicated in italics in FIG. 2.

Referring again to FIG. 1, all of the above parameters are made accessible by means of an application software module CONF_MNG 7 (FIG. 1), the function of which is to interrogate the database CONF_BDD 6 in order to extract from all the above configuration parameters stored therein the particular set of parameters Conf_M1, Conf_M2, . . . or Conf_Mn requested by an access interface IA1, IA2, . . . or IAn and its associated application software module M1, M2, . . . or Mn.

Finally, the terminal 1 includes an event manager module EVENT_MNG 8 (FIG. 1). By interrogating the operating system 5, which recovers information on the state of the network from the man-machine interface 3 in a manner that is known in the art, this module 8 indicates in real time the state of the network to which the terminal 1 is connected. The module EVENT_MNG 8 informs the configuration management module CONF_MNG 7 if a modification is made to any of the networks to which the terminal 1 is connected.

Such modifications include modifications within the network, for example a change of cell, a break in the network, etc., or a change from one network to another.

A configuration method implemented by the terminal 1 in the context of access by said terminal to the SMS message sending/receiving service via either the GSM network or the WiFi network is described below with reference to FIGS. 1 to 3.

In a step E1, the terminal 1 is switched on (ON state).

Then, in a step E2, the event manager module EVENT_MNG 8 interrogates the operating system 5 to determine if the terminal 1 is already connected either to the GSM network or to the WiFi network.

If not, in a step E3, the event manager module EVENT_MNG 8 interrogates the operating system 5 again to determine if the terminal 1 is in the process of being connected to the GSM or WiFi network. If so, the operating system 5 recovers this information from the man-machine interface 3 and forwards it to the event manager module EVENT-MNG 8. In the present example, the network to which a default connection is being made is the GSM network. This information is contained in a message R1 sent by the operating system 5 in the form of a tag of the type network="GSM".

In a step E4, the event manager module EVENT_MNG 8 sends this tag R1 to the configuration manager module CONF_MNG 7.

In a step E5, the SMS send/receive service access interface IA1 is activated.

In a step E6, the module M1 associated with the access interface IA1 sends a request R2 to the configuration manager module CONF_MNG 7 to obtain the configuration parameters for the intended service in the particular network. This kind of request takes the following form: <GetConfiguration module="SMS"/>.

In a step E7, the configuration manager module CONF_MNG 7 sends a request R3 to the database CONF_BDD 6 including information "GSM" relating to the connected network and information "SMS" relating to the service. These parameters are then cross-referenced in the database CONF_BDD 6 to extract all of the parameters Conf_M1 in the FIG. 2 correspondence table T.

Then, in a step E8, the database CONF_BDD 6 sends a message R4 to the configuration manager module CONF_MNG 7 including the IP address of the service center SMS-C in the GSM network.

In a step E9, the configuration manager module CONF_MNG 7 forwards the message R4 to the module M1 which then commands termination of activation of the access interface IA1, which is then used for SMS sending/receiving in the GSM network.

Steps E'3 to E'8, similar to the above steps E3 to E8, are also effected if, in the step E2, a modification is made in the GSM network. This is particularly advantageous. In the present example, one such modification is matching by the terminal 1 to the WiFi network.

In the step E'3, the event manager module EVENT_MNG 8 interrogates the operating system 5 to determine to which of the networks (GSM or WiFi) the terminal 1 is in the process of being connected. The operating system 5 then sends the event manager module EVENT_MNG 8 a message R'1 in the form of a tag of the type network="WiFi".

In the step E'4, the event manager module EVENT_MNG 8 sends this tag R'1 to the configuration manager module CONF_MNG 7.

In the step E'5, the SMS send/receive service access interface IA1 is activated.

In the step E'6, the module M1 associated with the access interface IA1 sends a request R'2 to the configuration manager module CONF_MNG 7 to obtain the configuration parameters for the intended service in the particular network. This kind of request takes the following form, for example: <GetConfiguration module="SMS"/>.

In a step E'7, the configuration manager module CONF_MNG 7 sends a request R'3 to the database CONF_BDD 6 including information "WiFi" relating to the connected network and information "SMS" relating to the service. These parameters are then cross-referenced in the database CONF_BDD 6 to extract all the parameters Conf_M1 in the FIG. 2 correspondence table T.

Then, in a step E'8, the database CONF_BDD 6 sends a message R'4 to the configuration manager module CONF_MNG 7 including the IP address of the service center SMS-C in the WiFi network.

In a step E'9, the configuration manager module CONF_MNG 7 forwards the message R'4 to the module M1 which then commands termination of activation of the access interface IA1, which is then used for SMS sending/receiving in the WiFi network.

The configuration method described above configures the terminal 1 in real time as a function of the type of network to which it is connected and the type of service it is intended to access, even in the event of a modification relating to the connected network.

Manual configuration by the user of some of the above steps can also be envisaged.

When a user wishes to access a given service, for example SMS message sending/receiving, they select, using the keypad (not shown) of the terminal 1, for example, an item "SMS parameters" in a list of parameters each associated with a telecommunications service. A list of this kind is displayed on the screen (not shown) of the terminal 1, for example in a "Services" menu. A window is then displayed on the screen of the terminal 1, showing:

a first list indicating the type of network (GSM, EDGE, WiFi, PSTN, etc.) to which the user wishes to be connected via their terminal 1;

a second list indicating the configuration parameters associated with each type of network (IP address of the service center SMS-C).

The user selects the items of interest in each of the first and second lists, for example "GSM" in the first list and the IP address 215.52.36.10, which corresponds to that of the service center SMS-C in the GSM network.

The effect of this selection is to activate the database CONF_BDD 6 to extract the set of parameters Conf_M1 from the FIG. 2 correspondence table T.

The database CONF_BDD 6 then sends a message to the configuration manager module CONF_MNG 7 including the IP address of the service center SMS-C in the GSM network, which was selected manually by the user.

The configuration manager module CONF_MNG 7 then forwards said message to the module M1 which then commands termination of activation of the access interface IA1, which is then used for SMS sending/receiving in the GSM network.

It is therefore easy to configure the terminal 1 at the initiative of the user so that the terminal is ready to send/receive SMS messages in the GSM network.

This selection from a menu and the various associated steps are executed in a specific application software module installed in the terminal 1.

An embodiment of the present disclosure provides for configuring a telecommunications terminal in real time and without manual intervention as a function of the type of network to which the terminal is connected and the service the terminal is seeking to access.

Although the present disclosure has been described with reference to one or more examples, workers skilled in the art will recognize that changes may be made in form and detail without departing from the scope of the disclosure and/or the appended claims.

The invention claimed is:

1. A method of configuring a telecommunications terminal able to communicate with a number of telecommunications networks offering a number of respective telecommunications services, said terminal including interfaces for accessing said services offered, said method comprises the following steps, when the terminal accesses one of the services offered via one of said networks:
   a) determining a type of network to which the terminal is in the process of being connected;
   b) activating the access interface associated with said service that the terminal is intended to access;
   c) requesting at said activated access interface configuration parameters that are a function of said activated access interface and said network in the process of connection;
   d) extracting said requested configuration parameters from a module for centralizing configuration parameters; and
   e) obtaining said extracted configuration parameters at said activated access interface.

2. The method according to claim 1, wherein the step a) of determining the type of network is effected either on starting the terminal or in the event of a modification relating to the connected network.

3. The method according to claim 1, wherein the step a) of determining the type of network and the step c) of requesting configuration parameters are effected manually.

4. A telecommunications terminal able to communicate with a number of telecommunications networks offering a number of respective telecommunications services, said terminal including interfaces for accessing said services offered, said terminal comprising:
   a) means for determining a type of network to which the terminal is in the process of being connected;
   b) means for activating the access interface associated with said service that the terminal is intended to access;
   c) means for requesting configuration parameters that are a function of said activated access interface and said network in the process of connection;
   d) means for extracting said requested configuration parameters from a module for centralizing configuration parameters; and
   e) means for obtaining said extracted configuration parameters.

5. The terminal according to claim 4, further including manual selection means for selecting the type of network to which the terminal is intended to be connected and configuration parameters associated with said network to be connected to and with the service that the terminal is intended to access in said network.

6. A computer program installed in a telecommunications terminal able to communicate with a number of telecommunications networks offering a number of respective telecommunications services, said terminal including a plurality of access interfaces to said services, said program including instructions for implementing steps of a method of configuring the telecommunications terminal when the program is executed by processing means of said terminal, wherein the method comprises the following steps, when the terminal accesses one of the services offered via one of said networks:
   a) determining a type of network to which the terminal is in the process of being connected;
   b) activating the access interface associated with said service that the terminal is intended to access;
   c) requesting at said activated access interface configuration parameters that are a function of said activated access interface and said network in the process of connection;
   d) extracting said requested configuration parameters from a module for centralizing configuration parameters; and
   e) obtaining said extracted configuration parameters at said activated access interface.

7. A computer-readable storage medium storing a computer program including instructions for executing steps of a method of configuring a telecommunications terminal able to communicate with a number of telecommunications networks offering a number of respective telecommunications services, said terminal including interfaces for accessing said services offered, wherein the method comprises the following steps, when the terminal accesses one of the services offered via one of said networks:
   a) determining a type of network to which the terminal is in the process of being connected;
   b) activating the access interface associated with said service that the terminal is intended to access;
   c) requesting at said activated access interface configuration parameters that are a function of said activated access interface and said network in the process of connection;
   d) extracting said requested configuration parameters from a module for centralizing configuration parameters; and
   e) obtaining said extracted configuration parameters at said activated access interface.

* * * * *